Patented Sept. 21, 1954

2,689,835

UNITED STATES PATENT OFFICE 2,689,835

SYNTHETIC COPOLYMER OF METHYL-PENTADIENE AND CYCLOPENTADIENE

Howard L. Wilson, Raritan Township, Union County, and Lawrence W. Anderson, Roselle, N. J., assignors to Standard Oil Development Company, a corporation of Delaware No Drawing. Application December 27, 1951, Serial No. 263,691

12 Claims. (Cl. 260—23.7)

This invention relates to low temperature polymeric materials, and particularly to novel copolymers of methylpentadiene and cyclopentadiene, and to the Friedel-Crafts process for their preparation.

It has been found possible to produce tough, rubber-like products having good Mooney viscosity characteristics and improved handling properties by the copolymerization of a major proportion of methylpentadiene with a minor proportion of cyclopentadiene at low temperatures in the presence of a dissolved Friedel-Crafts catalyst. In particular, highly useful copolymers have been prepared by the copolymerization of mixtures of methylpentadiene and commercial cyclopentadiene. It has been found that the copolymers so produced are much superior to the already known polymethylpentadiene, particularly in tensile strength and tear properties. These new copolymers also are less thermoplastic and have better milling characteristics.

The methylpentadienes used as the major reactant have a linear chain of 5 carbon atoms and a methyl substituent located somewhere in the chain. At least one of the double linkages is located between the first and second carbon atoms. Specific examples include 2-methyl-1,3-pentadiene, 3-methyl-1,3-pentadiene and 4-methyl-1,3-pentadiene. Any one of these methylpentadienes or mixtures thereof can be admixed with cyclopentadiene to serve as the major olefinic starting material. One convenient method is to use a mixture of 2-methyl-1,3-pentadiene and 4-methyl-1,3-pentadiene in admixture with the cyclopentadiene. Such a mixture of methylpentadienes containing from 70 to 90%, usually about 75 to 85%, of the 2-methyl isomer and the balance of the 4-methyl isomer is obtained commercially by the dehydration of 2-methyl-2,4-pentanediol. Mixtures ranging from 75% to 95% by weight of methylpentadienes with from 25% to 5% by weight of cyclopentadiene can be employed.

From industrial operations, commercial cyclopentadiene is usually obtained as the dimer, dicyclopentadiene. The dimer is then cracked and monomeric cyclopentadiene is fractionated out to give high purity cyclopentadiene. The crude cyclopentadiene concentrate which is obtained as a commercial product may contain about 75% cyclopentadiene and about 10 to 15% methylcyclopentadiene both as the dimers. This mixture is cracked and a cyclopentadiene stream taken overhead. The overhead may contain from 85 to 98% cyclopentadiene, from 0 to 7.5% methylcyclopentadiene, and from 2 to 7.5% acyclic dienes. A typical composition contains 92% cyclopentadiene, 4% methylcyclopentadiene, and 4% acyclic dienes.

In practicing the invention, the raw material olefinic mixture is cooled to a temperature below about —20° C., preferably to a temperature between about —90° C. to —100° C. or even as low as —165° C., either by the use of a refrigerating jacket upon the reactor or by the admixture with the reactants of a suitable refrigerant such as solid carbon dioxide, liquid ethylene, liquid ethane, or liquid methane, or the like. To the cold olefinic material there is then added a dissolved Friedel-Crafts catalyst such as aluminum chloride dissolved in methyl or ethyl chloride. When the desired conversion of the olefinic reactants has been reached and a sufficient amount of the olefins has copolymerized into the desired product, the reaction mixture may be dumped into warm water, alcohol or alcoholic solution, warm soda solution, or some other suitable material to deactivate the catalyst and volatilize any unreacted olefinic material and refrigerant and/or diluent. The polymer is then washed with further quantities of water, for instance, on an open mill, and then dried for further processing steps.

As the low temperature Friedel-Crafts catalyst, there may be used aluminum chloride, aluminum bromide, aluminum iodide, boron fluoride, double salts of aluminum halides, titanium tetrachloride, hydroxylated aluminum halides, the uranium chlorides, and other known active Friedel-Crafts compounds or their equivalents. It is considered essential that the Friedel-Crafts catalyst employed should be in solution during its addition and throughout its presence in the reaction mixture.

For the catalyst solvent, substantially any of the low boiling alkyl halides may be employed whether they are mono or polyhalides, as well as low boiling hydrocarbons, and other well known Friedel-Crafts catalyst solvents. The essential requirements for the catalyst solvent are that the freezing point be below about 0° C. and a lack of complex formation by the solvent with either the Friedel-Crafts catalyst or with the reactants.

It is desirable but not necessary that the olefinic mixture of methylpentadiene and cyclopentadiene be diluted with an appropriate diluent or diluent-refrigerant, such as the lower alkyl halides, or low boiling hydrocarbons, such as methyl or ethyl chloride, ethylidene fluoride, and butane and pentane. One very convenient method of operation employs a solution of aluminum chloride in methyl chloride as the dissolved Friedel-Crafts catalyst for polymerization and uses methyl chloride as a diluent in the reaction.

The resulting copolymer may have a molecular weight falling within the range from 10,000 up to 50,000 as determined by the Staudinger method.

The copolymers are rubbery materials and may be compounded and used in much the same manner as natural rubber or synthetic rubber copolymers. Such substances as carbon black, stearic acid, zinc oxide, sulfur, and the usual vulcanization agents and accelerators can be satisfactorily compounded with the copolymer to produce cured or vulcanized products. The compounding may be conducted on an open mill and the curing carried out under conditions of heat and pressure in a manner closely analogous to that utilized for natural rubber to yield a material of good tensile strength and good elongation and modulus values. By suitable compounding modifications, the copolymer may also be utilized for the preparation of mechanical goods or for the making of molded objects.

EXAMPLE 1

A mixture was prepared containing about 300 parts by weight of commercial methylpentadiene consisting predominantly of 2-methyl-1,3-pentadiene and about 100 parts by weight of cyclopentadiene monomer concentrate containing about 75% cyclopentadiene and substantial quantities of methyl-cyclopentadiene and other dienes. There was added about 1000 parts of methyl chloride as diluent. The mixture was cooled to approximately −100° C. by external liquid ethylene refrigeration. To the cold solution was added a catalyst solution containing about 0.40 g. of dissolved aluminum chloride per 100 cc. of methyl chloride. The polymerization reaction proceeded promptly and gave a copolymer which was a rubbery material. The catalyst was deactivated with alcohol, the reaction mixture was dumped and the copolymer was allowed to warm up to room temperature. The wet product was hot milled to eliminate moisture. The product obtained has a Staudinger molecular weight of 15,000 to 20,000 and showed very good properties and good milling characteristics, over a wide temperature range, from 100° F. to 325° F. In contrast, polymethylpentadiene must be milled at a temperature within the range of 100° to 180° F. to insure stability.

EXAMPLE 2

A number of comparative samples were prepared in the same manner as that described in Example 1. In each case commercial methylpentadiene and high purity cyclopentadiene containing about 92% of cyclopentadiene and about 4% each of methylcyclopentadiene and acyclic dienes was used in the reaction mixture. The properties of the copolymers so obtained are shown in Table I.

Table I
METHYLPENTADIENE-CYCLOPENTADIENE COPOLYMERS

| Run No. | Feed Material | Parts by wt. | Catalyst Conc. | Catalyst Eff. | Percent Conv. based on total diolefins in feed | Iodine No. $I_2\text{-}Hg(OAc)_2$* | Mol. Wt., Staud. |
|---|---|---|---|---|---|---|---|
| 1 | Methylpentadiene / Cyclopentadiene / MeCl | 93 / 7 / 425 | 0.40 | 126 | 60.2 | 332 | 15,200 |
| 2 | Methylpentadiene / Cyclopentadiene / MeCl | 86 / 14 / 395 | 0.38 | 227 | 74.3 | 334 | 15,600 |
| 3 | Methylpentadiene / Cyclopentadiene / MeCl | 86 / 14 / 395 | 0.40 | 178 | 49.7 | 313 | 16,400 |
| 4 | Methylpentadiene / Cyclopentadiene / MeCl | 75 / 25 / 345 | 0.40 | 294 | 71.0 | 304 | 22,000 |
| 5 | Methylpentadiene / MeCl | 100 / 460 | 0.40 | 167 | 80 | 368.3 | 20,400 |

*Gallo, Wiese and Nelson, Ind. Eng. Chem. 40, 1277 (1948).

EXAMPLE 3

The samples as prepared in Example 2 were compounded according to the following vulcanization recipe. The samples were subjected to cures at 307° F. for varying times as shown in the table following.

Component: Parts by weight
- Polymer _____ 100
- Carbon black _____ 50
- Zinc oxide _____ 5
- Stearic acid _____ 1
- Sulfur _____ 3
- N-cyclohexyl-2-benzothiazole sulfenamide _ 1
- Petrolatum _____ 2
- Dioctylphthalate _____ 7.6

The results obtained from testing of the vulcanized samples are shown below in Table II.

Table II
VULCANIZATION DATA

| Run No. | Time of Cure, Min. | Micro Cures @ 307° F. | | | |
|---|---|---|---|---|---|
| | | Tensile | Elong. | 300% Mod. | Tear R. T. |
| 1 | 30 | 1,050 | 365 | 855 | 165 |
| | 45 | 1,170 | 295 | 1,155 | 155 |
| | 60 | 1,195 | 270 | ------ | 160 |
| 2 | 30 | 1,200 | 355 | 1,030 | 180 |
| | 45 | 1,330 | 265 | ------ | 205 |
| | 60 | 1,535 | 280 | ------ | 205 |
| 3 | 30 | 1,470 | 395 | 1,245 | 235 |
| | 45 | 1,700 | 305 | 1,660 | 270 |
| | 60 | 1,830 | 290 | ------ | 295 |
| 4 | 30 | 1,720 | 325 | 1,630 | 280 |
| | 45 | 2,045 | 275 | ------ | 330 |
| | 60 | 2,103 | 255 | ------ | 305 |
| 5 | 45 | 1,000 | 310 | 970 | 140 |

The improvements which are obtained with addition of minor amounts of cyclopentadiene to the methylpentadiene feed can be observed from the data of Table II showing vulcanization data. Improvements in tensile strength and 300% modulus values of the copolymers over the properties of the polymethylpentadiene are clearly indicated. Increased toughness and improved mill handling properties are also exhibited by the copolymers containing cyclopentadiene over the polymethylpentadiene polymer.

What is claimed is:

1. A process for the preparation of an improved rubbery synthetic copolymer which comprises copolymerizing a mixture of from 75% to 95% by weight of methylpentadienes and from 25% to 5% by weight of cyclopentadienes at a temperature of −90° C. to −165° C. by the addition thereto of a dissolved Friedel-Crafts catalyst.

2. A process for the preparation of an improved rubbery synthetic copolymer which comprises copolymerizing a mixture of from 75% to 95% by weight of methylpentadienes and from 25% to 5% by weight of cyclopentadienes at a temperature of −95° C. to −103° C. in the presence of a dissolved Friedel-Crafts catalyst consisting of aluminum chloride dissolved in methyl chloride.

3. A process for the preparation of an improved rubbery synthetic copolymer comprising copolymerizing a mixture of from 75% to 95% by weight of 2-methyl pentadiene and from 25% to 5% by weight of cyclopentadiene at a temperature of about 100° C., by the addition of aluminum chloride dissolved in methyl chloride.

4. A process for the preparation of an improved rubbery synthetic copolymer which comprises copolymerizing from 75% to 95% by weight of a mixture of 2-methyl-1,3-pentadiene and 4-methyl-1,3 pentadiene and from 25% to 5% by weight of cyclopentadiene at a temperature of about 100° C., by the addition of aluminum chloride dissolved in methyl chloride.

5. A composition of matter comprising a rubbery synthetic, solid, low temperature copolymer consisting of from 75% to 95% by weight of polymerized methylpentadienes and from 25% to 5% by weight of polymerized cyclopentadienes, said copolymer having a Staudinger molecular weight of 10,000 to 50,000.

6. A composition of matter comprising a synthetic, solid copolymer consisting of from 75% to 95% by weight of polymerized 2-methyl-1,3-pentadiene and 4-methyl-1,3-pentadiene and from 25% to 5% by weight of polymerized cyclopentadiene, said copolymer having a Staudinger molecular weight of 10,000 to 50,000.

7. A curable composition comprising a synthetic, solid copolymer containing from 75% to 95% by weight of polymerized methylpentadienes and from 25% to 5% by weight of polymerized cyclopentadienes, carbon black, sulfur and at least one vulcanization accelerator, said copolymer having a Staudinger molecular weight of 10,000 to 50,000.

8. A curable composition comprising a rubbery synthetic, solid copolymer containing from 75% to 95% by weight of a polymerized methylpentadiene and from 25% to 5% by weight of polymerized cyclopentadiene, carbon black, zinc oxide, stearic acid, sulfur and at least one vulcanization accelerator, said copolymer having a Staudinger molecular weight of about 15,000 to 20,000 and having an iodine number of about 304 to 334.

9. A cured, rubbery composition comprising a mixture containing a synthetic, solid, low temperature copolymer consisting of from 75% to 95% by weight of polymerized methylpentadiene and from 25% to 5% by weight of polymerized cyclopentadiene, vulcanized in the presence of carbon black, sulfur, and at least one vulcanization accelerator, said copolymer having before vulcanization a Staudinger molecular weight of about 10,000 to 50,000.

10. Product according to claim 9 having a tensile strength of about 1170 to about 2100, a 300% modulus of about 1030 to 1630 and a tear strength of about 155 to 330.

11. Composition according to claim 5 comprising a copolymer of about 75% by weight of commercial 2-methyl pentadiene and 25% by weight of commercial cyclopentadiene, said copolymer having a Staudinger molecular weight of about 22,000 and an iodine number of about 304.

12. Composition according to claim 5 comprising a copolymer of about 86% by weight of commercial 2-methyl pentadiene and about 14% by weight of commercial cyclopentadiene, said copolymer having a Staudinger molecular weight of about 16,400 and an iodine number of about 313.

References Cited in the file of this patent

UNITED STATES PATENTS

| Number | Name | Date |
|---|---|---|
| 2,352,979 | Soday | July 4, 1944 |
| 2,352,980 | Soday | July 4, 1944 |
| 2,352,981 | Soday | July 4, 1944 |
| 2,439,610 | Morris et al. | Apr. 13, 1948 |
| 2,449,949 | Morris et al. | Sept. 21, 1948 |
| 2,514,928 | Bishop et al. | July 11, 1950 |